US006982019B2

(12) United States Patent
Rey-Mermet et al.

(10) Patent No.: US 6,982,019 B2
(45) Date of Patent: Jan. 3, 2006

(54) METHOD FOR MANUFACTURING A BATCH OF MULTI-LAYERED CELLS, SUCH AS LIQUID CRYSTAL DISPLAY CELLS, OR ELECTROCHEMICAL PHOTOVOLTAIC CELLS

(75) Inventors: Gilles Rey-Mermet, Le Landeron (CH); Rolf Klappert, Neuchatel (CH); Nicolas Blanckaert, Neuchatel (CH)

(73) Assignee: Asulab S.A., Marin (CH)

( * ) Notice: Subject to any disclaimer, the term of this patent is extended or adjusted under 35 U.S.C. 154(b) by 241 days.

(21) Appl. No.: 10/448,362

(22) Filed: May 30, 2003

(65) Prior Publication Data

US 2003/0234905 A1    Dec. 25, 2003

(30) Foreign Application Priority Data

Jun. 21, 2002    (CH) .................................... 1078/02

(51) Int. Cl.
    B32B 7/00    (2006.01)
(52) U.S. Cl. .................... 156/145; 349/189; 349/74; 349/78; 349/106; 349/77; 349/155; 349/154; 349/153; 349/94; 349/88; 349/92; 349/296; 438/456
(58) Field of Classification Search ............... 156/145; 349/189, 74, 78, 106, 77, 155, 154, 153, 349/94, 88, 92; 359/296; 438/456
    See application file for complete search history.

(56) References Cited

U.S. PATENT DOCUMENTS

| 5,386,307 | A | * | 1/1995 | Jang ............................. 349/81 |
| 5,469,280 | A | * | 11/1995 | Jang ............................. 349/74 |
| 6,093,578 | A | * | 7/2000 | Klappert et al. .............. 438/30 |
| 6,099,672 | A | | 8/2000 | Yamazaki et al. |
| 6,562,640 | B1 | * | 5/2003 | Tseng et al. ................... 438/15 |
| 2002/0014303 | A1 | | 2/2002 | Kotani et al. |
| 2002/0033911 | A1 | * | 3/2002 | Ishida et al. ................... 349/74 |
| 2003/0043316 | A1 | * | 3/2003 | Matsumoto et al. ........... 349/84 |

FOREIGN PATENT DOCUMENTS

GB    2 320 356 A1    6/1998

OTHER PUBLICATIONS

Patent Abstracts of Japan, vol. 006, No. 265, Dec. 24, 1982 & JP 57 161724 (Nippon Denki KK) Oct. 5, 1982.
Patent Abstracts of Japan, vol. 005, No. 017, Jan. 31, 1981 & JP 55 146415 (Hitachi Ltd.) Nov. 14, 1980.

* cited by examiner

Primary Examiner—Steven D. Maki
Assistant Examiner—Chris Schatz
(74) Attorney, Agent, or Firm—Sughrue Mion, PLLC

(57) ABSTRACT

The present invention concerns a method for manufacturing a plurality of multi-layered cells, particularly liquid crystal display cells, or electrochemical photovoltaic cells, or a combination of such cells, each cell including at least two superposed sealed cavities each delimited by a sealing frame and filled with a liquid, this method comprising the step of collectively manufacturing a batch of cells including at least three plates common to all the display cells and connected to each other by patterns of sealing material connecting said plates to each other and forming the sealing frames which delimit the cavities of said cells, this method being characterised in that filling holes are pierced through the plates such that each of the cavities of a cell is fed by a different filling hole, each of the filling holes being in communication with at least two cells and feeding the cavities of the same level, i.e. comprised between the same two plates, or different levels of these at least two cells, said filling holes being isolated in a sealed manner from the cavities that they must not feed.

14 Claims, 6 Drawing Sheets

METHOD FOR MANUFACTURING A BATCH OF MULTI-LAYERED CELLS, SUCH AS LIQUID CRYSTAL DISPLAY CELLS, OR ELECTROCHEMICAL PHOTOVOLTAIC CELLS

BACKGROUND OF THE INVENTION

The present invention concerns the field of multi-layered cells, i.e. cells comprising a plurality of superposed substrates, joined in pairs by sealing frames that delimit sealed volumes for containing a medium whose optical properties are capable of changing via the effect of applying an electric voltage, or whose electrical properties can be modified via the effect of incident light.

In the simplest case, electro-optical cells such as liquid crystal cells, or electrochemical photovoltaic cells include only two substrates, namely a transparent front substrate and a back substrate that may or may not be transparent. A network of conductive elements is formed on these two substrates forming electrodes and conductive paths connecting the electrodes to a supply or control circuit. The two substrates are joined to each other by means of a sealing frame defining a sealed volume in which the active medium is trapped.

Electro-optical cells are display cells wherein the optical features of the liquid crystals trapped between the two substrates of such cells can be modified by control voltages applied to the electrodes. Electrochemical photovoltaic cells are capable of converting visible light into electricity by exploiting the photoelectric effect, which appears in a semiconductor substrate sensitised by a dyeing agent.

In the simplest case where the cells include only two substrates and one layer of active agent trapped between the two, filling the cells does not raise any particular problems. A filling aperture is simply arranged in the sealing frames through which the active agent can penetrate the sealed volume delimited by said sealing frame. Filling is usually carried out in the following manner: after arranging the cell and the liquid crystal in a vacuum chamber, air is extracted from the cell containment volume, then the side of the cell where the filling aperture is located is plunged into a receptacle containing the active agent. The active agent penetrates the cell via capillary action, through the filling hole, helped by an increase in pressure in the chamber. When the cell has been filled, the filling aperture need only be hermetically sealed.

Another known solution consists in piercing a filling hole in one of the cell substrates. After having extracted the air, the active agent is injected though the hole into the cell and, after the cell has been filled, said hole is sealed. This second solution proves particularly advantageous insofar as it allows the cells to be filled from above, which means that one can work with sets of cells still in batches.

Whichever solution is used in order to fill single layer cells, it is clear that this step of manufacturing said cells does not raise any major problem, in particular because of the fact that only a single type of active agent is used. Consequently, even if the active agent, for example a liquid crystal, flows out of the filling hole and wets the periphery of the cell or the substrates, it is not liable to be polluted by another liquid crystal or damaging a structure of the cell that has already been deposited.

The same is not true however with cells having several levels which contain different active agents. In this case, the aforementioned problem becomes important quickly and the risk of polluting one of the active agents such as a liquid crystal by another liquid crystal is quite high.

Let us imagine the case, for example, of a liquid crystal display cell with two levels including two layers of different liquid crystals generating different optical effects. Such a cell can be formed classically of an intermediate substrate that carries the electrodes on its two faces and of two upper and lower substrates arranged on either side of the intermediate substrate. Each cell is thus formed by joining the upper substrate, respectively the lower substrate, to the intermediate substrate by means of two sealing frames that each delimits a sealed cavity to contain the liquid crystals. These sealing frames each include a filling hole, the filling holes being preferably arranged on a same side of the cell. In order to fill the cell, two foam plugs or stoppers each saturated with the desired liquid crystal are then applied against the filling apertures, and then the different liquid crystals can penetrate, as described hereinbefore, their respective cavities. After removing the stoppers, the filling apertures need only be hermetically sealed.

The method described hereinbefore advantageously allows the different levels of a multi-layered cell to be simultaneously filled with liquid crystals, the optical properties of which can vary from one layer to the next. However, the limits of this method are quickly discovered. Indeed, in order to implement this method, it is still necessary to be able to have at least one side of the cell available, free of any connection paths insofar as these connection paths, which are used to connect the cell electrodes to an external control circuit, are usually arranged along one edge of said cell where a substrate projects with respect to the next substrate. Thus, it would be difficult to access a filling hole arranged in the sealing frame at a location where the connection paths appear. The more levels a cell has, the more the number of its electrodes and thus its connection paths increases. One could thus have a situation in which the connection paths open out along all the sides of a cell, such that the filling technique described hereinbefore can no longer be used. Moreover, in the best case, this technique only allows one cell to be filled at a time, which is slow, tedious and substantially increases the manufacturing costs of such cells.

SUMMARY OF THE INVENTION

It is an object of the present invention to overcome the aforementioned problems in addition to others, by providing a method for manufacturing multi-layered cells such as liquid crystal cells that makes the cells both simple and quick to fill.

The present invention concerns a method for manufacturing a plurality of multi-layered cells, particularly liquid crystal display cells, or electrochemical photovoltaic cells, or a combination of such cells, each cell comprising at least two superposed sealed cavities each delimited by a sealing frame and filled with a liquid, this method including the step of collectively manufacturing a batch of cells comprising at least three plates common to all the display cells and connected to each other by patterns of sealing material linking said plates to each other, and forming sealing frames which delimit the cavities of said cells, this method being characterised in that filling holes are pierced through the plates such that each of the cavities of a cell is fed by a different filling hole, each of the filling holes communicating with at least two cells and feeding the cavities of the same level, i.e. comprised between the two same plates, or of different levels of said at least two cells, said filling holes being isolated in a sealed manner from the cavities that they must not feed.

As a result of these features, the present invention provides a method that allows all of the multi-layered cell manufacturing operations to be carried out while the cells are still in batches. In particular, the present invention allows multi-layered cells to be filled prior to their final separation from the batch, which, as will easily be understood, allows substantial savings to be made. Moreover, a same filling hole enables at least two cavities of two different cells to be filled simultaneously, which further accelerates the manufacturing method. The present invention also allows less cumbersome and more economical cells to be made since only four substrates, instead of six, are necessary to make, for example, a tri-chromic cell comprising three layers of liquid crystal with different optical properties.

According to another feature of the invention, the batch of cells is formed of at least two sub-assemblies each including two plates connected to each other by a pattern of sealing material forming the sealing frames of the single-layer cells, the at least two single-layer cell sub-assemblies being then secured to each other such that the single-layer cells are superposed in pairs and, after separation, they form single multiple-layered cells.

In this case too, the present invention allows significant savings in time and money. Indeed, according to the prior art, when those skilled in the art wanted to make, for example a tri-chromic liquid crystal cell, from individual cells each comprising a liquid crystal producing different optical effects, they had to fill these single-layer cells while they were still in batches, then bond three of these batches of cells on top of each other before finally being able to separate said cells. In addition to involving a waste of time, this multiplication of the number of operations necessary to make coloured liquid crystal display cells had the notable drawback of obliging those skilled in the art to handle batches of cells already filled with liquid crystals, with the accompanying risk of breaking such a batch during manufacture. Conversely, owing to the present invention, the batches of single-layer cells can be bonded on top of each other while said cells are still empty, then the cells can be filled.

BRIEF DESCRIPTION OF THE DRAWING

Other features and advantages of the present invention will appear more clearly from the following detailed description of an implementation of the method according to the invention, this example being given solely by way of non-limiting illustration in conjunction with the annexed drawing, in which.

DETAILED DESCRIPTION OF THE INVENTION

The present invention proceeds from the general inventive idea that consists in providing, in an assembly of substrates joined in pairs by patterns of sealing material which form the sealing frames of cells with several active layers, filling holes which will allow the layers of the same level of at least two distinct cells to be filled with liquid. Owing to these features, it is thus possible to fill, without any difficulty, the layers, for example of a colour cell comprising three liquid crystals with different optical properties, even when the cell is still in a batch. The risk of polluting one liquid crystal with another is thus avoided, and the method for manufacturing liquid crystal cells is greatly facilitated, and is thus less expensive to implement. The filling holes could be pierced in the plates before the latter are assembled, or pierced through the plates when they have already been assembled.

The present invention will be described in conjunction with a liquid crystal type multi-layered display cell. It goes without saying that the present invention is not limited to such a cell type and that it applies in an identical manner to any type of multi-layered cell enclosing between its substrates a sensitive material able to change its physical properties, particularly optical properties, via the effect of a voltage applied to the electrodes, or electrical properties via the effect of an incident light beam. In particular, the present invention applies to electrochemical photovoltaic cells like those disclosed in International Application No. WO 99/41 638 in the name of the Applicant, which is incorporated here by reference. Likewise, the present invention applies to a combination of a liquid crystal cell and a photovoltaic cell of the type specified herein before.

Figure 1:
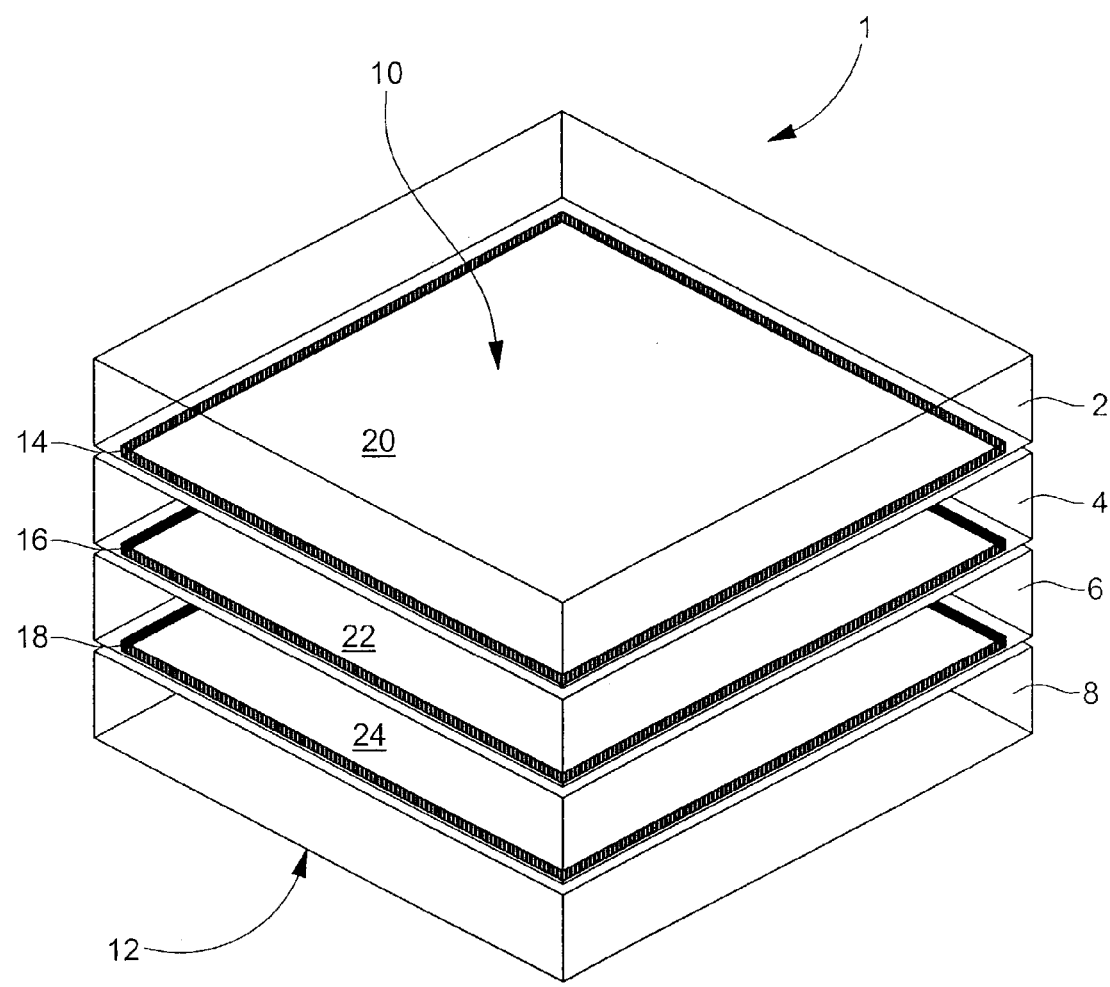
FIG. 1 is a transparent perspective view of a multi-layer liquid crystal display cell, which can be obtained by the method according to the present invention.

FIG. 1 is a transparent perspective view of a liquid crystal multi-layered display cell of the type able to be obtained by implementing the method according to the present invention. Designated in its whole by the general reference numeral 1, this display cell includes four superposed substrates 2, 4, 6 and 8, which can be made of glass or another transparent material such as plastic. It will be noted that the last substrate 8 may or may not be transparent, depending upon whether display cell 1 is reflective or transmissive. The upper surface 10 of the first substrate 2 and the lower surface 12 of the last substrate 8 constitute the external faces of said cell 1.

Substrates 2 to 8 are joined in pairs by sealing frames 14, 16 and 18, which each delimit a sealed cavity, respectively 20, 22 and 24, for containing liquid crystals that can have different optical qualities as regards the light, for example respectively reflecting blue, green and red to form a colour display. More precisely, the first sealing frame 14 joins substrates 2 and 4, the second sealing frame 16 joins substrates 4 and 6, and the third sealing frame 18 joins substrates 6 and 8.

Figure 2:
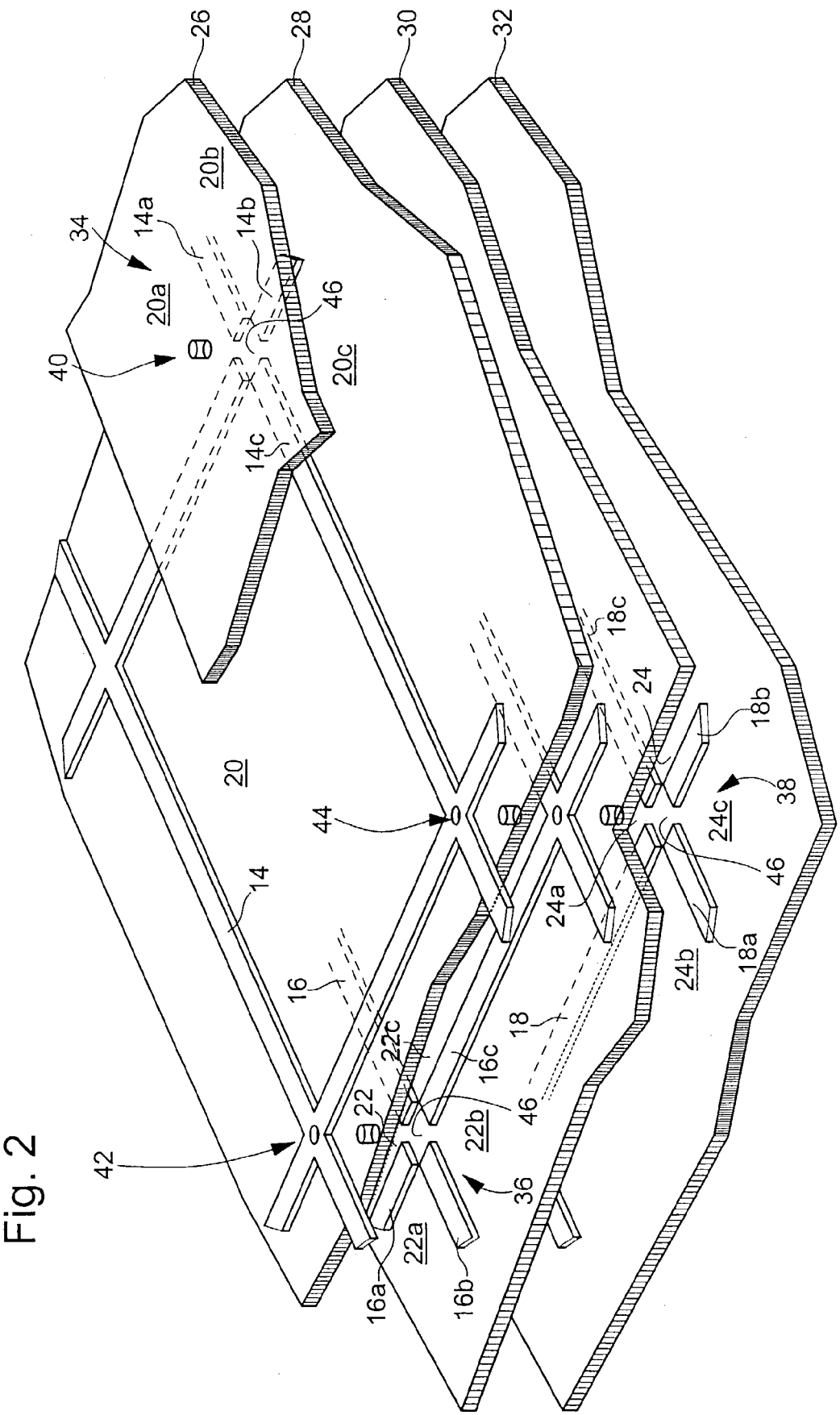
FIG. 2 is a partial transparent perspective view of four superposed plates common to all the display cells of the same type as that shown in FIG. 1.

Display cell 1 described hereinbefore is representative of the type of cell that it is possible to obtain by implementing the method according to the present invention as will become clear from the following description made with reference to FIG. 2 and the subsequent Figures.

Figure 3:
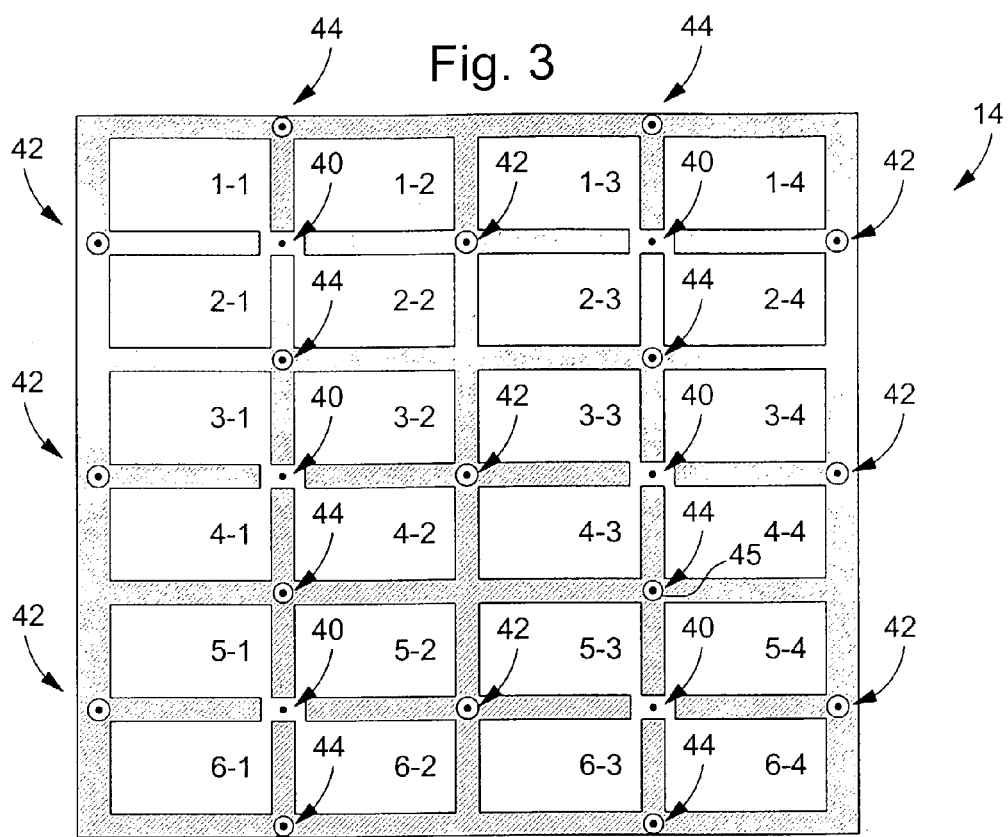
FIGS. 3 to 5 are plan views of the patterns of sealing material delimiting the cavities to be filled between the first and second plates, between the second and third plates, and between the third and fourth plates.

FIG. 2 is a partial perspective exploded view of four superposed plates 26, 28, 30 and 32 common to all display cells 1 as can be seen in particular in FIG. 3. Plates 26, 28, 30 and 32 can be made of glass or another transparent synthetic material such as plastic. Patterns of sealing material 34, 36 and 38 join plates 26, 28, 30 and 32 to each other and form sealing frames 14, 16 and 18 which will each delimit a sealed cavity 20, 22 and 24 to contain a liquid crystal.

FIG. 2 shows portions of the sealing frames of the neighbouring cells. Thus, sealing frames 14a, 14b and 14c extend in proximity to sealing frame 14, between plates 26 and 28, and define the first filling level of the cells formed jointly by the subsequent joining of plates 26, 28, 30 and 32. Likewise, sealing frames 16a, 16b and 16c extend in proximity to sealing frame 16, between plates 28 and 30, and define the second filling level of the cells to come. Finally, sealing frames 18a, 18b and 18c extend in proximity to sealing frame 18, between plates 30 and 32, and define the third filling level of the cells that will be obtained by separating the batch.

Sealing frames 14a–14c, 16a–16c and 18a–18c each define a sealed cavity 20a–20c, 22a–22c and 24a–24c respectively for containing a liquid crystal. As can be seen upon examining FIG. 2, all of the cavities of the same level, i.e. comprised between the two same plates, communicate with at least one other cavity. More precisely, cavity 20 communicates with cavities 20a–20c of the neighbouring cells, just as cavities 22 and 24 communicate with cavities 22a–22c and 24a–24c respectively.

Filling holes 40, 42 and 44 enable the layers of the same level of at least two different cells to be filled. Thus, the first filling hole 40, pierced through first plate 26 outside the perimeter of the sealing frames of the cells, communicates with cavities 20, 20a–20c delimited by the first and second plates 26 and 28 and by sealing frames 14, 14a–14c. Likewise, the second filling hole 42, pierced through first and second plates 26 and 28 outside the perimeter of the sealing frames of the cells, passes, in a sealed manner, through the first filling level of the cells defined by cavities 20, 20a–20c and communicates with cavities 22, 22a–22c delimited by second and third plates 28 and 30 and by sealing frames 16, 16a–16c. Finally, the third filling hole 44, pierced through first, second and third plates 26, 28 and 30 outside the perimeter of the sealing frames of the cells, passes, in a sealed manner, through the first and second filling levels of the cells defined respectively by cavities 20, 20a–20c and 22, 22a–22c and communicates with cavities 24, 24a–24c delimited by the third and fourth plates 30 and 32 and by sealing frames 18, 18a–18c.

As will be understood in the light of the foregoing, each of the cavities of the same cell is fed by a different filling hole, and each filling hole communicates with the cavities of the same level, i.e. comprised between the same two plates, or of different levels of at least two different cells, these filling holes, arranged in the glass or plastic plates so as to open out outside the perimeter of the cell sealing frames, thus being isolated in a sealed manner as regards the cavities that they must not feed.

In order to prevent the liquid crystal infiltrating between the plates of a level that it is not intended to fill, walls 45, also made of sealing material, could be provided, which would have for example a circular shape and ensure continuity between the holes arranged in two successive plates.

When a filling hole, for example the third hole 44, reaches cavities 24, 24a–24c that it has to allow to be filled after having successively passed through the first and second level of the batch of cells in a sealed manner, it opens out into a distribution chamber 46 for the liquid crystal, also made of sealing material, which allows the liquid crystal to be directed towards cavities 24, 24a–24c to be filled.

Figure 4:
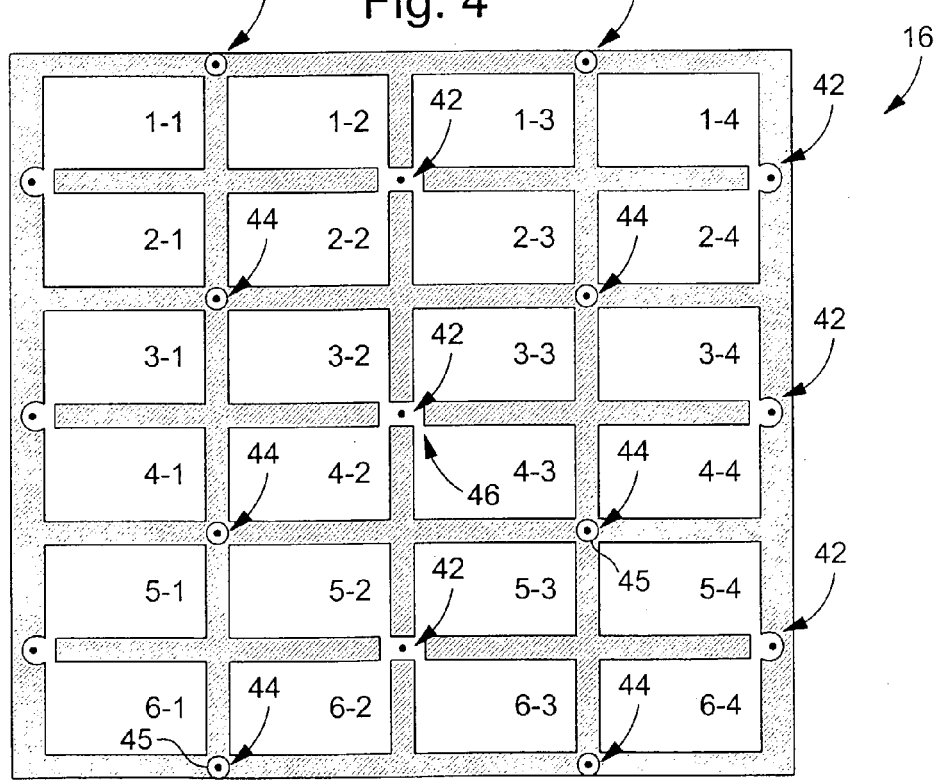
Figure 5:
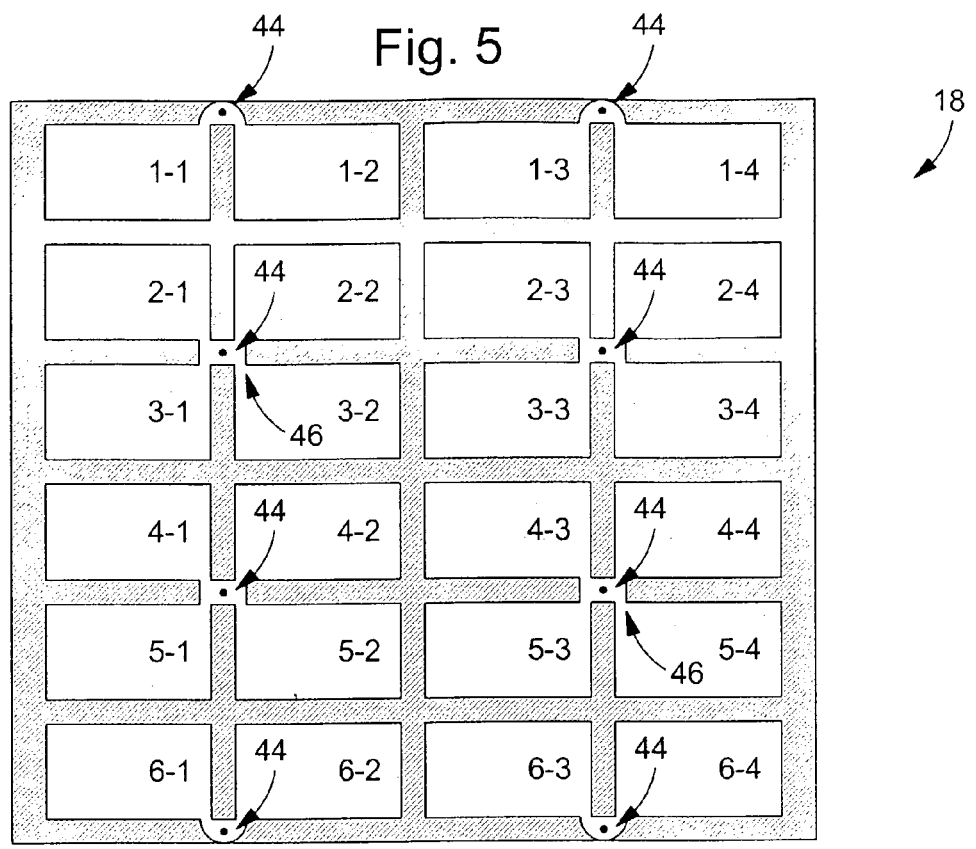

Reference will now be made to FIGS. 3 to 5 which are plan views of the patterns of sealing material delimiting the cavities to be filled and comprised respectively between the first and second plates, between the second and third plates, and between the third and fourth plates. A batch of twenty-four cells has been shown in the drawing. It goes without saying that this example is given solely by way of illustration and that the number and shape of the cells that form the batch has no influence on the implementation of the method according to the invention. The cells shown in the drawing are of rectangular shape and are arranged in an arrangement of six lines and four columns. This is why, in the following description, the cell located at the intersection of line i and column j will be called cell i-j.

Several filling holes 40 are visible in FIG. 3. It will be recalled that these filling holes 40, pierced through first plate 26 outside the perimeter of the cell sealing frames, communicate with the cavities of the first level delimited by the first and second plates 26 and 28. This is how one of these filling holes 40 allows the first level of the four cells 1—1, 1-2, 2-1 and 2—2 to be simultaneously filled. Likewise, another of these filling holes 40 allows the first level of the four cells 5-3, 5-4, 6-3 and 6-4 to be simultaneously filled. The multiple filling holes 40 each communicate with a liquid crystal distribution chamber 46 which opens out into the cavities to be filled.

Several filling holes 42 can also be seen in FIG. 3. It will be recalled that these filling holes 42, pierced through the first and second plates 26 and 28 outside the perimeter of the cell sealing frames, communicate with the cavities of the second level delimited by the second and third plates 28 and 30. This is how one of these filling holes 42, arranged along the edge of the batch of cells, will allow the second level of cells 1—1 and 2-1 to be simultaneously filled. Likewise, another of these filling holes 42 will allow the second level of cells 3-2, 3—3, 4-2 and 4-3 to be simultaneously filled. It will be noted, however, that since FIG. 3 is a plan view of the sealing material pattern comprised between the first and second plates 26 and 28, filling holes 42 do not communicate with the cavities to be filled in this first level. This is why, in FIG. 3, filling holes 42 are each surrounded by a wall 45, which allows said filling holes to pass, in a sealed manner, through the free space between said first and second plates 26 and 28.

Finally, several filling holes 44 can be seen in FIG. 3. It will be recalled that these filling holes 44, pierced through the first, second and third plates 26, 28 and 30 outside the perimeter of the cell sealing frames, communicate with the cavities of the third level delimited by the third and fourth plates 30 and 32. This is how one of these filling holes 44, arranged along one of the edges of the batch of cells, will enable the third level of cells 6-1 and 6-2 to be simultaneously filled. Likewise, another of these filling holes 44 will enable the third level of cells 2-3, 2-4, 3—3 and 3-4 to be simultaneously filled. It will be noted that, for the same reasons as explained in conjunction with filling holes 42, filling holes 44 do not communicate with the cavities delimited by the first and second plates 26 and 28 and are thus each surrounded by a wall 45, which enables them to pass through the free space between these two plates 26 and 28 in a sealed manner.

FIG. 4 is a plan view of the pattern of sealing material that joins second and third plates 28 and 30 and which delimits the cavities intended to be filled with a liquid crystal to form the second level of the display cells.

First of all, it will be noted that filling holes 40, which enable the first level of cells to be filled are not shown, since these holes 40 are only pierced in first plate 26 and that this first plate has not been shown in FIG. 4. However, it can be seen that filling holes 42 all open out into liquid crystal distribution chambers 46 that lead said liquid crystal to the cavities to be filled. Thus, by again considering the same filling holes 42 as those mentioned in connection with FIG. 3, it can be seen that one of these holes allows the second level of cells 1—1 and 2-1 to be simultaneously filled and that another hole allows the second level of cells 3-2, 3—3, 4-2 and 4-3 to be simultaneously filled. Finally, filling holes 44, which allows the third level of the cells to be filled, are each surrounded by a wall 45 which allows them to pass, in a sealed manner, through the free space between plates 28 and 30.

Finally, reference will be made to FIG. 5 which is a plan view of the pattern of sealing material which joins third and fourth plates 30 and 32 and which delimits the cavities intended to be filled with a liquid crystal to form the third level of the display cells.

First of all, it will be noted that filling holes 40, 42, which allow the first and second levels of the cells to be filled respectively, have not been shown, since these holes 40 and 42 are only pierced in the first and second plates 26, 28 and that these plates have not been shown in FIG. 5. However, it can be seen that filling holes 44 all open out into liquid crystal distribution chambers 46 that lead said liquid crystal to the cavities to be filled. Thus, again considering the same filling holes 44 as mentioned in connection with FIG. 3, it can be seen that one of these holes allows the third level of cells 6-1 and 6-2 to be simultaneously filled, whereas another hole allows the third level of cells 2-3, 2-4, 3—3 and 3-4 to be filled.

It will be understood, in the light of the foregoing, that each of the levels of a cell is in communication with a different hole, each hole allowing the layers of the same level of at least two different cells to be fed, the holes being arranged in the plates such that all the layers of all the cells are fed with liquid crystal.

After filling, the cells are sealed by filling the filling openings using sealing material, then the cells are separated by any appropriate cutting technique.

Additionally, extra holes 48 (see FIG. 6) can be pierced through the three plates 26, 28 and 30 to allow a liquid sealing material to be brought, which will spread all around the cell sealing frames over the three levels and which will subsequently harden for example by heating. Thus thinner sealing frames can be made and sealing material originally in the liquid state can be added to make the extra thickness. One of the advantages of this embodiment is that it enables fragile structures, deposited before the sealing wall is made, to be coated using liquid sealing material.

Figure 6:
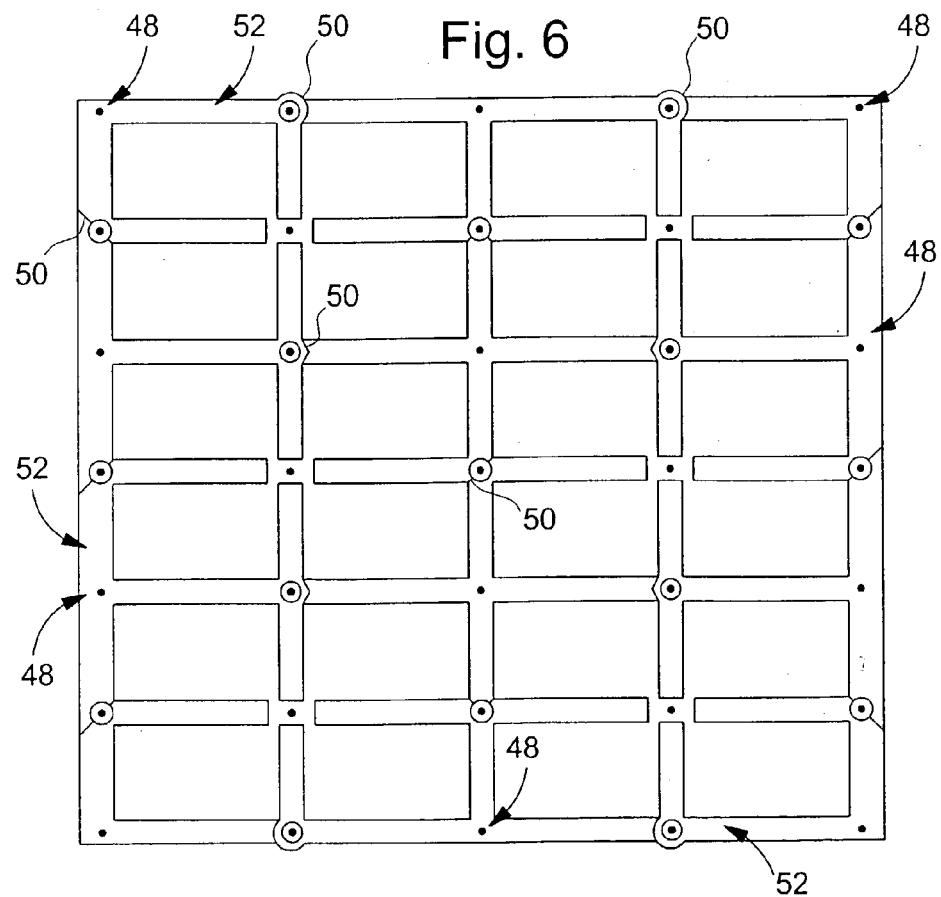
FIG. 6 is a plan view of a pattern of sealing material delimiting the cavities to be filled between the different plates, holes for filling with a sealing liquid being provided.

The presence of wall elements 50 that are intended to delimit channels 52 for filling with the liquid sealing material will be noted in FIG. 6. These channels 52 are in direct communication with holes 48 for bringing the liquid sealing material and advantageously limits the distance that such material has to travel when it is introduced between two successive plates, thus allowing homogenous filling.

Figure 7:
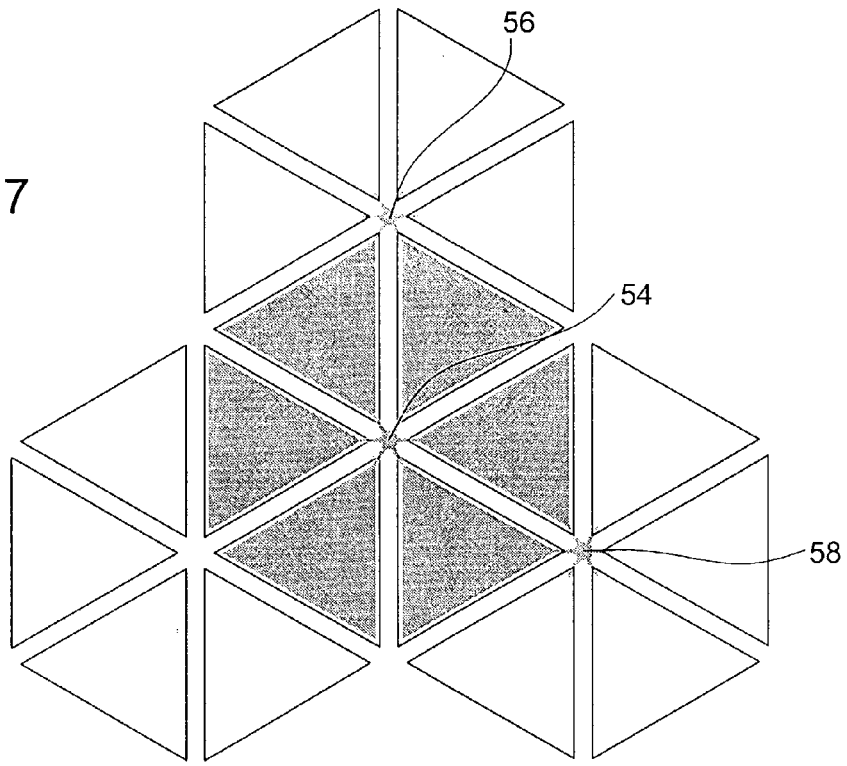
FIG. 7 is a plan view of a pattern of sealing material delimiting cells of triangular shape.
Figure 8:
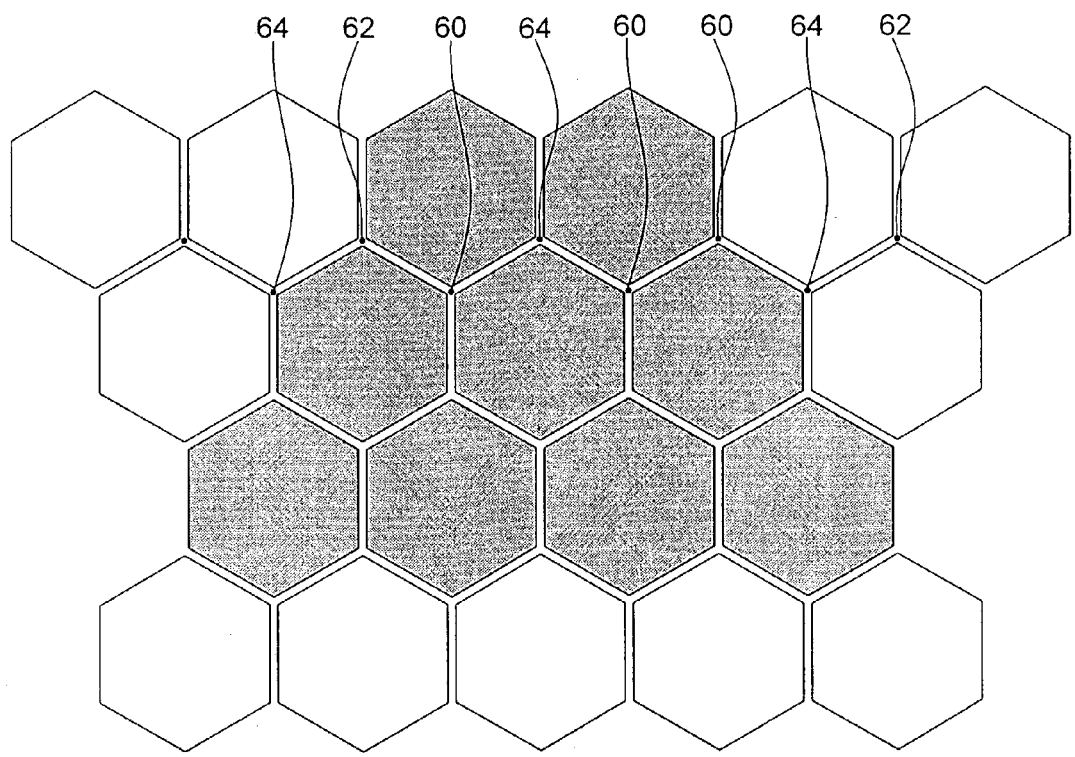
FIG. 8 is a plan view of a pattern of sealing material delimiting cells of hexagonal shape.

In the preceding Figures, cells of rectangular shape have been shown. Of course, the cells can differ from this shape and have for example a triangular appearance (see FIG. 7), filling holes 54, 56 and 58 being provided at each apex of the triangles for filling each time the six layers of the same level of six different cells. According to yet another variant, the cells can have a hexagonal shape (see FIG. 8), carefully arranged filling holes 60, 62 and 64 again allowing the three layers of all the cells to be filled.

It goes without saying that the present invention is not limited to the embodiments that have just been described, and that various modifications and simple variants can be envisaged by those skilled in the art without departing from the scope of the present invention. In particular, it is not necessary for the filling holes to be arranged at the point of intersection of two sides of a cell. Indeed, the filling holes can also be made at a place along the length of one side of a cell.

Likewise, it is not necessary for all the filling holes to be made on the same side of the set of cells.

Figure 9:
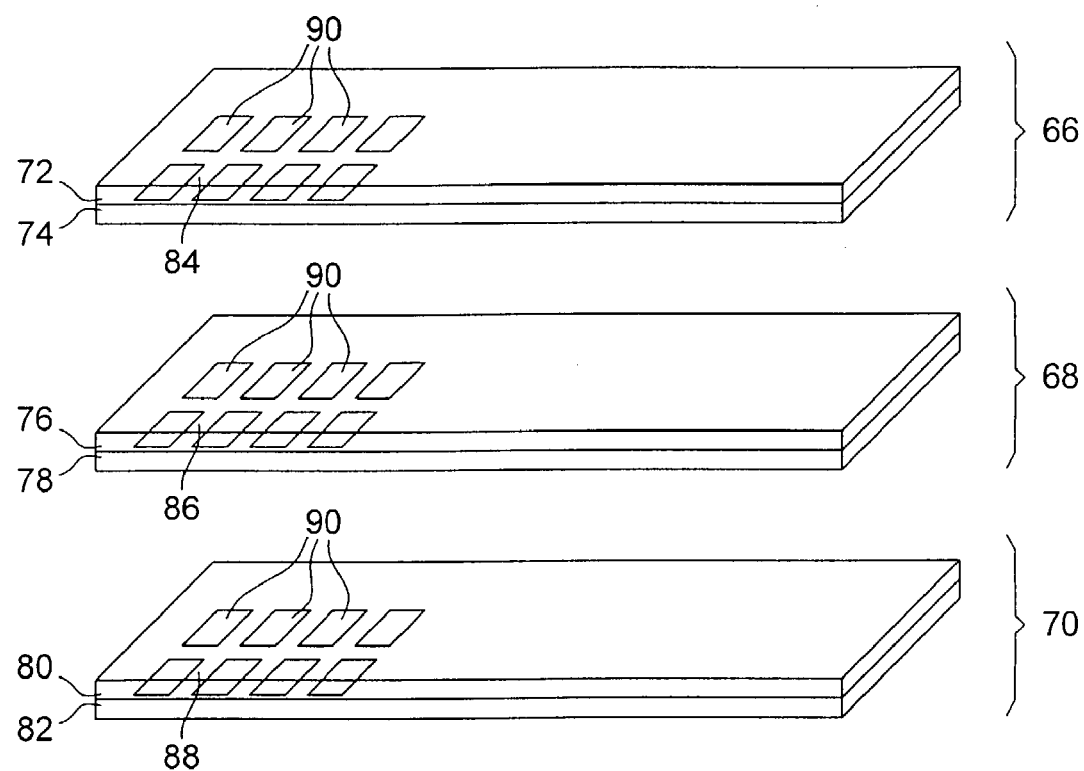
FIG. 9 is a perspective view of a batch of multi-layer cells formed by joining three cell sub-assemblies with a single active layer.

In the foregoing, reference was made to a cell with three levels of liquid crystal including four substrates 2, 4, 6 and 8, which means that the intermediate substrates 4 and 6 are framed by the upper and lower substrates 2 and 8 and are thus each common to two levels of the cell, i.e. they carry electrodes on both of their faces. One could however envisage applying the present method to a multi-layered cell, for example a tri-chromic cell, formed of individual cells each comprising a liquid crystal producing different optical effects. Thus, it is possible (see FIG. 9) to form three sub-assemblies 66, 68 and 70 each including two plates respectively 72, 74, 76, 78 and 80, 82 connected to each other by a pattern of sealing material 84, 86 and 88 forming the sealing frames of single-layer cells 90. Before pairing off the plates, care will be taken, according to the invention, to pierce filling holes in said plates which will enable the different levels of the cells to be filled simultaneously after assembling the three sub-assemblies. Finally, the three sub-assemblies are bonded such that the single-layer cells delimited by these three sub-assemblies are superposed and, after filling and separation, they form individual cells each comprising three layers of active agent.

What is claimed is:

1. A method for manufacturing a plurality of multi-layered cells, particularly liquid crystal display cells, or electrochemical photovoltaic cells, or a combination of such cells, each cell including at least two superposed sealed cavities each delimited by a sealing frame and filled with a liquid, said method comprising the steps of collectively manufacturing a batch of cells including at least three plates common to all the display cells and connected to each other by matrices of sealing material connecting said plates to each other and forming the sealing frames which delimit the cavities of said cells, wherein the method further comprises the step of piercing filling holes through the plates such that each of the cavities of a cell is fed by a different filling hole, each of the filling holes being in communication with one cavity of at least two cells and feeding the cavities of the same level, said filling holes being isolated in a sealed manner from the cavities that each said filling hole is not in communication with, such that said cavities which are not in communication with the respective filling holes are not filled.

2. The method according to claim 1, wherein the batch of cells is formed of at least two sub-assemblies each comprising two plates connected to each other by a matrix of sealing material forming the sealing frames of single-layer cells, the at least two single-layer cell sub-assemblies being then secured to each other such that the single-layer cells are superposed in pairs and, after separation, they form single cells with multiple layers.

3. The method according to claim 1, wherein the filling holes are pierced in the plates before the latter are assembled.

4. The method according to claim 2, wherein the filling holes are pierced in the plates before the latter are assembled.

5. The method according to claim 1, wherein the filling holes are pierced through the plates when the latter are already assembled.

6. The method according to claim 2, wherein the filling holes are pierced through the plates when the latter are already assembled.

7. The method according to claim 1, wherein the filling holes are each surrounded by a wall, which allows them to pass through the free space between two successive plates in a sealed manner.

8. The method according to claim 2, wherein the filling holes are each surrounded by a wall, which allows them to pass through the free space between two successive plates in a sealed manner.

9. The method according to claim 1, wherein the filling holes each communicate with a liquid crystal distribution chamber which leads said liquid crystal to the cavities to be filled.

10. The method according to claim 2, wherein the filling holes each communicate with a liquid crystal distribution chamber which leads said liquid crystal to the cavities to be filled.

11. The method according to claim 1, wherein the filling holes are pierced through the plates outside the perimeter of the sealing frames of the cells.

12. The method according to claim 2, wherein the filling holes are pierced through the plates outside the perimeter of the sealing frames of the cells.

13. The method according to claim 1, wherein at least certain filling holes are pierced in the back of the batch of cells.

14. The method according to claim 2, wherein at least certain filling holes are pierced in the back of the batch of cells.

* * * * *